United States Patent
Kuchipudi (12) 
(10) Patent No.: US 11,496,859 B2
(45) Date of Patent: Nov. 8, 2022

(54) LOCATING WIRELESS DEVICES

(71) Applicant: Omnitracs, LLC, Dallas, TX (US)

(72) Inventor: Lakshmi Kuchipudi, Dallas, TX (US)

(73) Assignee: Omnitracs, LLC, Dallas, TX (US)

( * ) Notice: Subject to any disclaimer, the term of this patent is extended or adjusted under 35 U.S.C. 154(b) by 0 days.

(21) Appl. No.: 17/174,074

(22) Filed: Feb. 11, 2021

(65) Prior Publication Data
US 2021/0258726 A1 Aug. 19, 2021

Related U.S. Application Data

(60) Provisional application No. 62/977,017, filed on Feb. 14, 2020.

(51) Int. Cl.
*H04W 24/00* (2009.01)
*H04W 4/02* (2018.01)
*H04W 64/00* (2009.01)

(52) U.S. Cl.
CPC .......... *H04W 4/023* (2013.01); *H04W 4/025* (2013.01); *H04W 64/003* (2013.01)

(58) Field of Classification Search
CPC .... H04W 4/023; H04W 4/025; H04W 64/003
See application file for complete search history.

(56) References Cited

U.S. PATENT DOCUMENTS

| | | | | |
|---|---|---|---|---|
| 2007/0290839 A1* | 12/2007 | Uyeki | ............ | G01C 21/3694 340/539.13 |
| 2010/0138140 A1* | 6/2010 | Okuyama | ........ | G08G 1/096822 701/533 |
| 2021/0173092 A1* | 6/2021 | Marolia | ................. | G01S 19/10 |

* cited by examiner

*Primary Examiner* — Erika A Washington
(74) *Attorney, Agent, or Firm* — Arentfox Schiff LLP (57) ABSTRACT

First receiving a first location in a path of a wireless device and a second location in the path, a first odometer value associated with the device corresponding to the first location, and a second odometer value associated with the device corresponding to the second location, wherein the path comprises a set of ordered locations. Determining a recommended distance between the first location and the second location. Determining a magnitude of a difference between the first odometer value and the second odometer value. Determining that the magnitude is greater than a threshold. Identifying, in response to the third determining, at least one candidate missing jurisdiction. Presenting each candidate missing jurisdiction. Second receiving a selection of each presented identified candidate missing jurisdiction. First predicting at least one node in the path in the selected jurisdiction. Second predicting a missing path including the first location, each predicted node, and the second location.

15 Claims, 7 Drawing Sheets

```
┌─────────────────────────────────────────────────────────────────────────┐
│ Receiving, by a device location server, a first location in a path of a │
│ wireless device and a second location in the path, a first odometer     │
│ value associated with the device corresponding to the first location,   │
│ and a second odometer value associated with the device corresponding    │
│ to the second location, wherein the path comprises a set of ordered     │
│ locations. 302                                                          │
└─────────────────────────────────────────────────────────────────────────┘
                                    ↓
┌─────────────────────────────────────────────────────────────────────────┐
│ Determining, by the server, a recommended distance between the first    │
│ and second locations 304                                                │
└─────────────────────────────────────────────────────────────────────────┘
                                    ↓
┌─────────────────────────────────────────────────────────────────────────┐
│ Determining, by the server, a magnitude of a difference between the     │
│ first odometer value and the second odometer value. 306                 │
└─────────────────────────────────────────────────────────────────────────┘
                                    ↓
┌─────────────────────────────────────────────────────────────────────────┐
│ Determining, by the server, that the magnitude is greater than a        │
│ threshold. 308                                                          │
└─────────────────────────────────────────────────────────────────────────┘
                                    ↓
┌─────────────────────────────────────────────────────────────────────────┐
│ Identifying, by the server in response to the third determining, at     │
│ least one candidate missing jurisdiction. 310                           │
└─────────────────────────────────────────────────────────────────────────┘
                                    ↓
┌─────────────────────────────────────────────────────────────────────────┐
│ Presenting, by the server, each candidate missing jurisdiction. 312     │
└─────────────────────────────────────────────────────────────────────────┘
                                    ↓
┌─────────────────────────────────────────────────────────────────────────┐
│ Rreceiving, by the server, a selection of each presented identified     │
│ candidate missing jurisdiction. 314                                     │
└─────────────────────────────────────────────────────────────────────────┘
                                    ↓
┌─────────────────────────────────────────────────────────────────────────┐
│ Predicting, by the server, at least one node in the path in the         │
│ selected jurisdiction. 316                                              │
└─────────────────────────────────────────────────────────────────────────┘
                                    ↓
┌─────────────────────────────────────────────────────────────────────────┐
│ Predicting, by the server, a missing path including the first location, │
│ each predicted node, and the second location. 318                       │
└─────────────────────────────────────────────────────────────────────────┘
```

LOCATING WIRELESS DEVICES

CROSS REFERENCE TO RELATED APPLICATIONS

This application claims the benefit of U.S. Provisional Application No. 62/977,017, filed Feb. 14, 2020, the contents of which are hereby incorporated herein in their entirety by reference.

BACKGROUND

Aspects of the present disclosure relate generally to wireless devices, and more particularly to techniques for locating wireless devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Example implementations of the technology disclosed herein include methods to locate wireless devices, including first receiving (for example, by a device location server): i) a first location in a path of a wireless device, ii) a second location in the path, iii) a first odometer value associated with the device corresponding to the first location, and iv) a second odometer value associated with the device corresponding to the second location. Each path includes a set of ordered locations. The server then can determine a recommended distance between the first location and the second location. Additionally, the method further includes second determining a magnitude of a difference between the first odometer value and the second odometer value; and whether the magnitude is greater than a threshold. Then, in response to determining that the magnitude is greater than the threshold, the server identifies at least one candidate missing jurisdiction. Additionally, the method further includes presenting, by the server, each candidate missing jurisdiction. The server then second receives a selection of each presented identified candidate missing jurisdiction. The server predicts at least one node in the path in the selected jurisdiction; and then predicts a missing path including the first location, each predicted node, and the second location.

Another example implementation includes an apparatus to locate wireless devices. The apparatus includes a memory and a processor in communication with the memory. The processor is configured, upon the execution of instructions store in memory to first receive: i) a first location in a path of a wireless device, ii) and a second location in the path, iii) a first odometer value associated with the device corresponding to the first location, and iv) a second odometer value associated with the device corresponding to the second location. Each path includes set of ordered locations. The processor is further configured to first determine a recommended distance between the first location and the second location, and second determine a magnitude of a difference between the first odometer value and the second odometer value. The processor is configured next to determine that the magnitude is greater than a threshold. For a magnitude greater than the threshold, the processor is configured to identify, in response to the third determining, at least one candidate missing jurisdiction. Additionally, the processor is configured to present, e.g., display for selection, each candidate missing jurisdiction. The processor further configured to receive a selection of each presented identified candidate missing jurisdiction. Additionally, the processor configured to predict at least one node in the path in the selected jurisdiction. Finally, the processor configured to predict, by the server, a missing path including the first location, each predicted node, and the second location.

Another example implementation includes an apparatus to locate wireless devices, comprising first means for receiving, by a device location server a first location in a path of a wireless device and a second location in the path, a first odometer value associated with the device corresponding to the first location, and a second odometer value associated with the device corresponding to the second location, wherein the path comprises a set of ordered locations. The apparatus further includes first means for determining, by the server, a recommended distance between the first location and the second location. Additionally, the apparatus further includes second means for determining, by the server, a magnitude of a difference between the first odometer value and the second odometer value. Additionally, the apparatus further includes third means for determining, by the server, that the magnitude is greater than a threshold. Additionally, the apparatus further includes means for identifying, by server in response to the third determining, at least one candidate missing jurisdiction. Additionally, the apparatus further includes means for presenting, by the server, each candidate missing jurisdiction. Additionally, the apparatus further includes second means for receiving, by the server, a selection of each presented identified candidate missing jurisdiction. Additionally, the apparatus further includes first means for predicting, by the server, at least one node in the path in the selected jurisdiction. Additionally, the apparatus further includes second means for predicting, by the server, a missing path including the first location, each predicted node, and the second location.

Another example implementation includes a computer-readable medium computer-readable medium comprising stored instructions to locate wireless devices, executable by a processor to first receive, by a device location server a first location in a path of a wireless device and a second location in the path, a first odometer value associated with the device corresponding to the first location, and a second odometer value associated with the device corresponding to the second location, wherein the path comprises a set of ordered locations. The instructions are further executable to determine, by the server, a recommended distance between the first location and the second location. Additionally, the instructions are further executable to determine, by the server, a magnitude of a difference between the first odometer value and the second odometer value. Additionally, the instructions are further executable to determine, by the server, that the magnitude is greater than a threshold. Additionally, the instructions are further executable to identify, by server in response to the third determining, at least one candidate missing jurisdiction. Additionally, the instructions are further executable to present, by the server, each candidate missing jurisdiction. Additionally, the instructions are further executable to receive, by the server, a selection of each presented identified candidate missing jurisdiction. Additionally, the instructions are further executable to predict, by the server, at least one node in the path in the selected jurisdiction. Additionally, the instructions are further executable to predict, by the server, a missing path including the first location, each predicted node, and the second location.

To the accomplishment of the foregoing and related ends, the one or more aspects of the present disclosure comprise the features hereinafter fully described and particularly pointed out in the claims. The following description and the annexed drawings set forth in detail certain illustrative features of the one or more aspects of the present disclosure. These features are indicative, however, of but a few of the various ways in which the principles of various aspects of the present disclosure may be employed, and this description is intended to include all such aspects and their equivalents.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional element or action, and in which.

DETAILED DESCRIPTION

It is a common occurrence in the trucking industry for geolocation coverage to be spotty, resulting in gaps in location data for the geolocation receiving device and for the vehicle. Being able to locate a particular vehicle, such as a delivery vehicle, is important to organizations that operate such vehicles. While Global Positioning System (GPS) can provide useful vehicle location information when a GPS receiver is 1) installed in the vehicle, 2) powered on, and 3) within radio frequency (RF) view of a sufficient number of GPS satellites, often one or more of those conditions does not obtain.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples of implementations of the described system based on the principles described herein, but it should be understood that these examples are not intended to limit the scope of the claims. For instance, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined with other features described in other examples.

Figure 1:
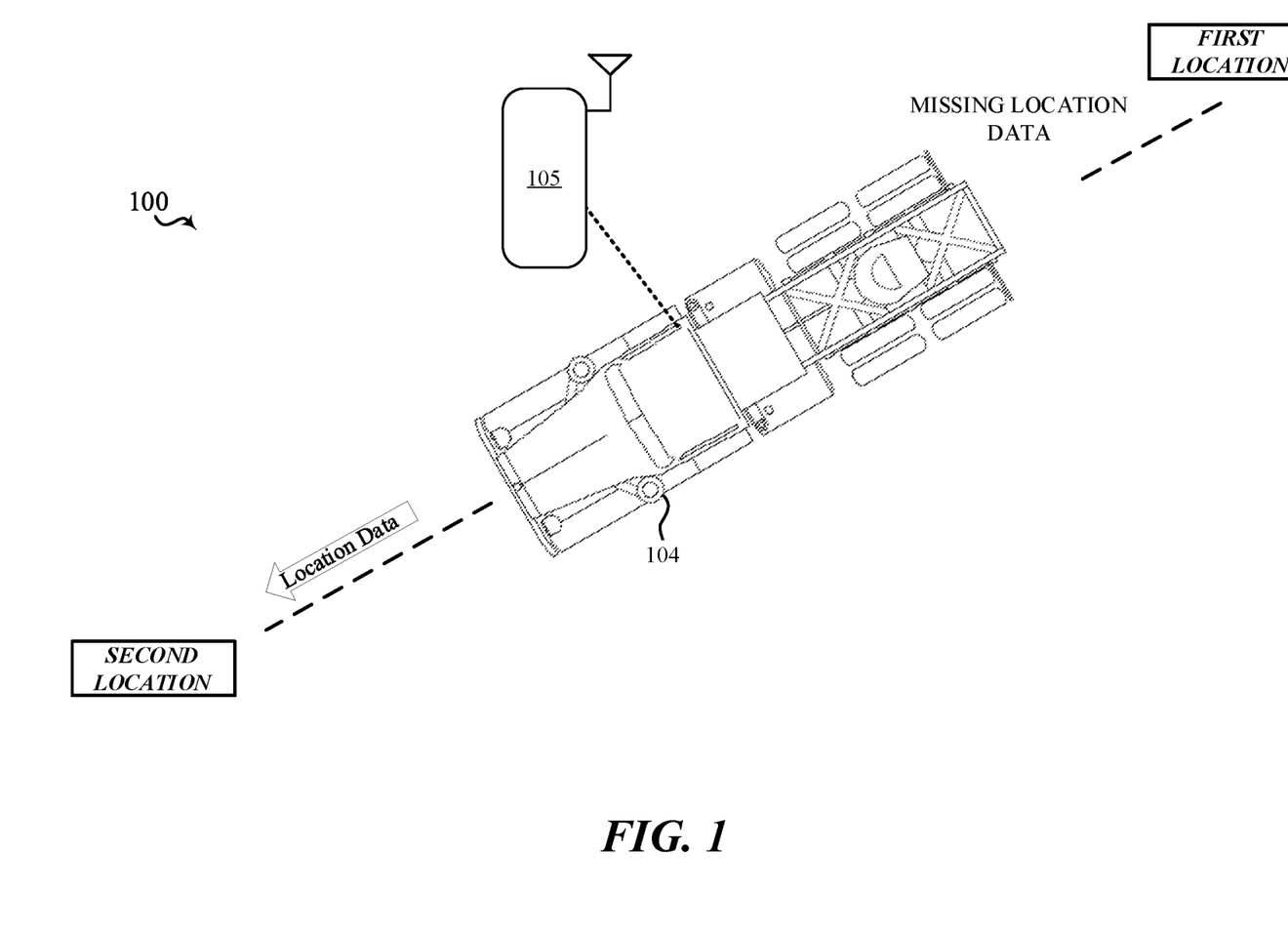
FIG. 1 is one example of an operational environment 100 for implementing techniques for locating wireless devices in accordance with aspects of the present disclosure.

FIG. 1, discussed here, includes one example of an operational environment 100 for implementing techniques for locating wireless devices. In some examples, a tractor 104 may include or may operate in association with a wireless device 105. In some examples, the computer device 105 may be or may include a smart phone, a tablet, an telematics device, an electronic logging device (ELD), or a laptop located inside or outside (e.g., carried by the driver) the tractor 104.

The device 105 associated with the tractor 104 may receive signals from geolocation systems such as the Global Positioning System (GPS), but as described above, while GPS can provide useful vehicle location information when a GPS receiver is 1) installed in the vehicle, 2) powered on, and 3) within radio frequency (RF) view of a sufficient number of GPS satellites, often one or more of those conditions does not obtain.

Figure 2:
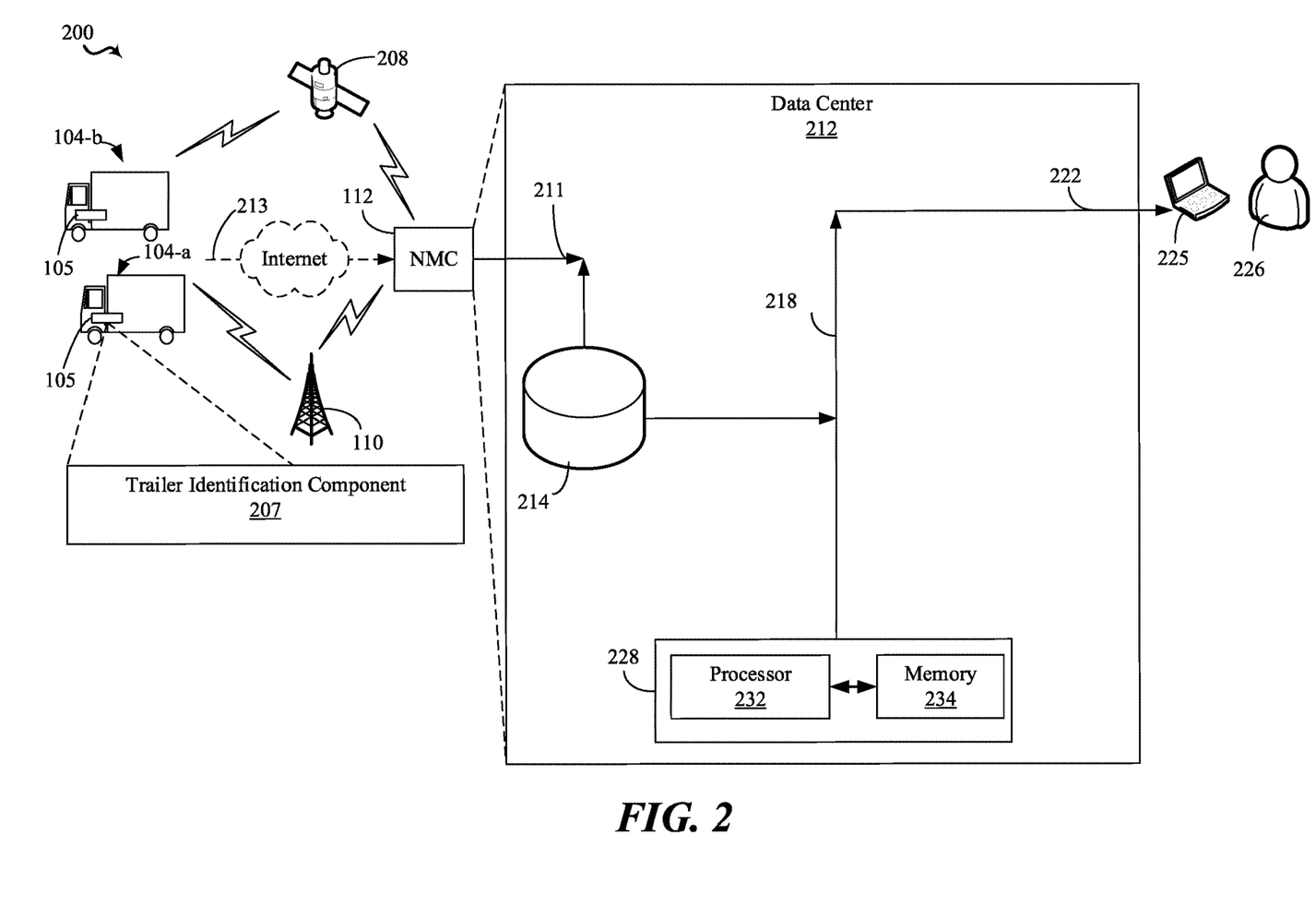
FIG. 2 is a functional block diagram of example elements of a system in accordance with aspects of the present disclosure.

Referring to FIG. 2, in an aspect, a system 200 includes one or more modules and components for locating wireless devices. As used herein, the terms "module(s)," or "components" may be one of the parts that make up a device, may be hardware or software or firmware, and may be divided into other modules and/or distributed across one or more processors.

In an aspect, system 200 can comprise a network management center (NMC) 112 configured to communicate with one or more vehicles 104 via the computer device 105 (e.g., ELD and/or mobile device, etc.) located on each tractor 104 or associated with each driver of each tractor 104. In some systems, the computer device 105 may be more than one device, such as an ELD that may communicate with the mobile device (e.g., a smart phone or an in-cab telematics device). The system 200 may include one or more fleets of vehicles 104, each fleet having at least one tractor 104. Typically, a fleet could include many tens, hundreds or thousands of vehicles. An example fleet is illustrated as having two vehicles 104. Each computer device 105 may include ELD functionality configured to collect and transmit data associated with the driver and/or the operation of the tractor 104 to the NMC 112. Also, in some implementations, each computer device 105 and/or its ELD functionality can be configured to perform calculations associated with one or more fleet using any of the collected data.

In an example implementation, the one or more vehicles 104 may be equipped with the computer device 105 in the form of a mobile device in communication with a separate ELD, where the mobile device may function as an in-cab telematics device. In some instances, the mobile device may be a smart phone or tablet configured to receive and process signals and information. In some instances, the ELD may be in communication with the mobile device to allow the collected information to be displayed on the mobile device. To this end, the computer device 105 in the form of either the ELD or the mobile device may include a trailer identification component 207 to perform one or more functions of the present disclosure.

In some implementations, the computer device 105 may include a processor configured to execute one or more processes and establish communication with external devices, such as NMC 112, via a communication network (e.g., a terrestrial or satellite-based wireless network). The computer device 105 may also include a memory configured to store computer-readable code that may define all or part of the device location functions described herein, and also to store data associated with the components and/or computer device 105. The computer device 105 may also include a user interface or display, a mobile application server, and a communications module (e.g., including the one or more transceivers, and one or more of terrestrial and Wi-Fi modems, one or more antennae, a GPS module, and a satellite communications module).

As an example only, each tractor 104 may be in bi-directional communication via the computer device 105 with NMC 112 over at least one communication channel. In the example shown in FIG. 2, each tractor 104 is in bi-directional communication with the NMC 112 over at least one of a satellite-based communication system 208 or a terrestrial-based system 110 (e.g., a wireless communication system using a communication protocol/technology such as, but not limited to, 5G or New Radio, GSM, CDMA, TDMA, WCDMA, EDGE, OFDM, GPRS, EV-DO, LTE, WiFi, Bluetooth), or, when the vehicle is stopped, via a wired connection 213 through the Internet. Depending on many factors, data may be exchanged with the vehicles 104 using one or both of the satellite communication system 208 and the terrestrial-based communication system 110.

In an aspect, many different types of data are collected and transferred from the vehicles 104 to the NMC 112. Examples of such data include, but are not limited to, vehicle performance data, driver performance data, critical events, messaging and position data, location delivery data, and many other types of data. All of the information that is communicated to and from the vehicles 104 may be processed via the NMC 112. The NMC 112 can be thought of as a data clearinghouse that receives all data that is transmitted to and received from the vehicles 104. Moreover, in an aspect, NMC 112 may include one or more back-end servers. Thus, in some aspects, the collected information may periodically (e.g., every x minutes, where x is a whole number, or once a day, or upon availability of a wired or wireless connection) be transmitted from the computer device 105 to the NMC 112 for analysis and record keeping. In addition to communication of the data collected by device 105 over wireless links to the NMC 112, data can be communicated between the device 105 or vehicle 104 by transfer of media from one to the other.

The system 200 also includes a data center 212, which may be part of or in communication with NMC 112. The data center 212 illustrates one possible implementation of a central repository for all of the data received from each of the vehicles 104. As an example, as mentioned above many different types of data are transmitted or otherwise communicates from the computer devices 105 associated with each of the vehicles 104 to the NMC 112. In the case where data center 212 is in communication with NMC 112, the data may be transmitted via connection 211 to the data center 212. The connection 211 may comprise any wired or wireless dedicated connection, a broadband connection, or any other communication channel configured to transport the data. Moreover, in an aspect, data center 212 may include one or more back-end servers analyzing the one or more parameters transmitted from the one or more computer devices 105. Additionally or alternatively, data may also be exchanged between the plurality of computer devices 105 using, for example, peer-to-peer (P2P) communication without the involvement of the NMC 112.

In an aspect, the data center 212 may include a data warehouse 214 for receiving the data from the computer device 105 relating to the tractor 104. In an aspect, for example, data center 212 may include any number of application servers and data stores, where each may be associated with a separate fleet and/or driver management or performance data. In an aspect, each application server and data store may include a processor, memory including volatile and non-volatile memory, specially-programmed operational software, a communication bus, an input/output mechanism, and other operational systems. For example, an application server may be a services portal (SP) server that receives, for example, messaging and positioning (M/P) data from each of the vehicles 104. Another application server, for example only, may include one or more servers related to safety and compliance, such as a quick deployment center (QDC) server that receives, for example, critical event (CE) data from each of the vehicles 104. Further, for example, another application server may be vehicle and driver performance data related to fuel usage and/or cost from each of the vehicles 104. It should be understood that the above list of example servers is for illustrative purposes only, and data center 212 may include additional and/or different application servers.

In some aspect, the trailer identification component 207 may further communicate with a terminal device 225, which can be a user interface portal, a web-based interface, a personal computer (PC), a laptop, a personal data assistant (PDA), a smart phone, a dedicated terminal, a dumb terminal, or any other device over which a user 226, such as a manager or operator responsible for monitoring a fleet of vehicles 104, may communicate.

In an aspect, the data center 212 may include an analysis engine 228 (also referred herein as a device location server 228, to analyze the data received from the computer device 105. The analysis engine 228 includes a processor 232 and a memory 234 the respectively execute and store instructions and data associated the operation of the data center 212. Although shown as residing within the data center 212, the analysis engine 228 may reside elsewhere, and may be implemented as a distributed system in which the processor 232 and the memory 234 may include one or more processor and memories, and may be located in different places, such as at NMC 112 and/or one or more servers associated with NMC 112 or data center 212.

Figure 3:
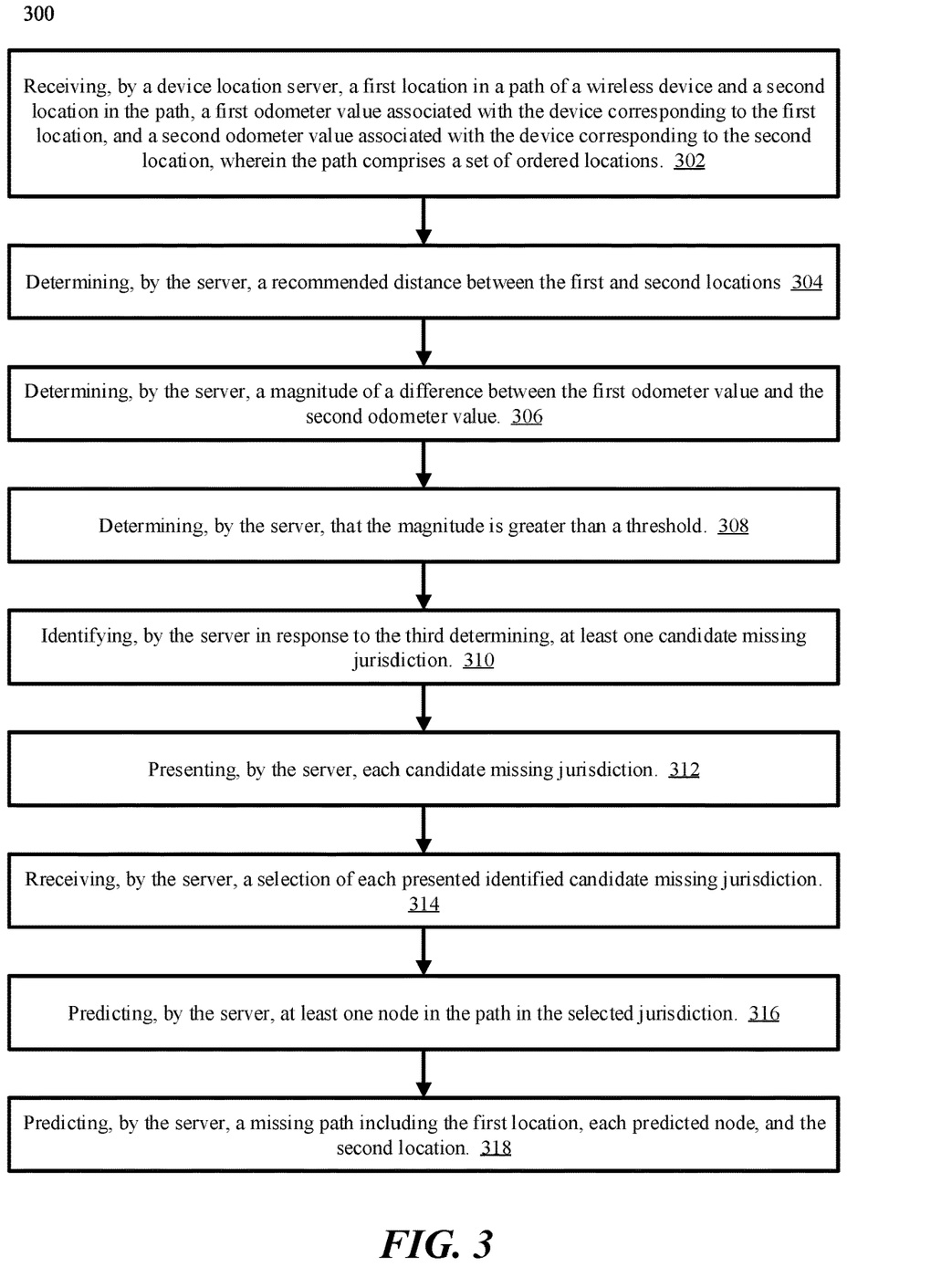
FIG. 3 is a flowchart of an example method for identifying trailers based on received signal strength levels of wireless signals in accordance with aspects of the present disclosure.
Figure 4:
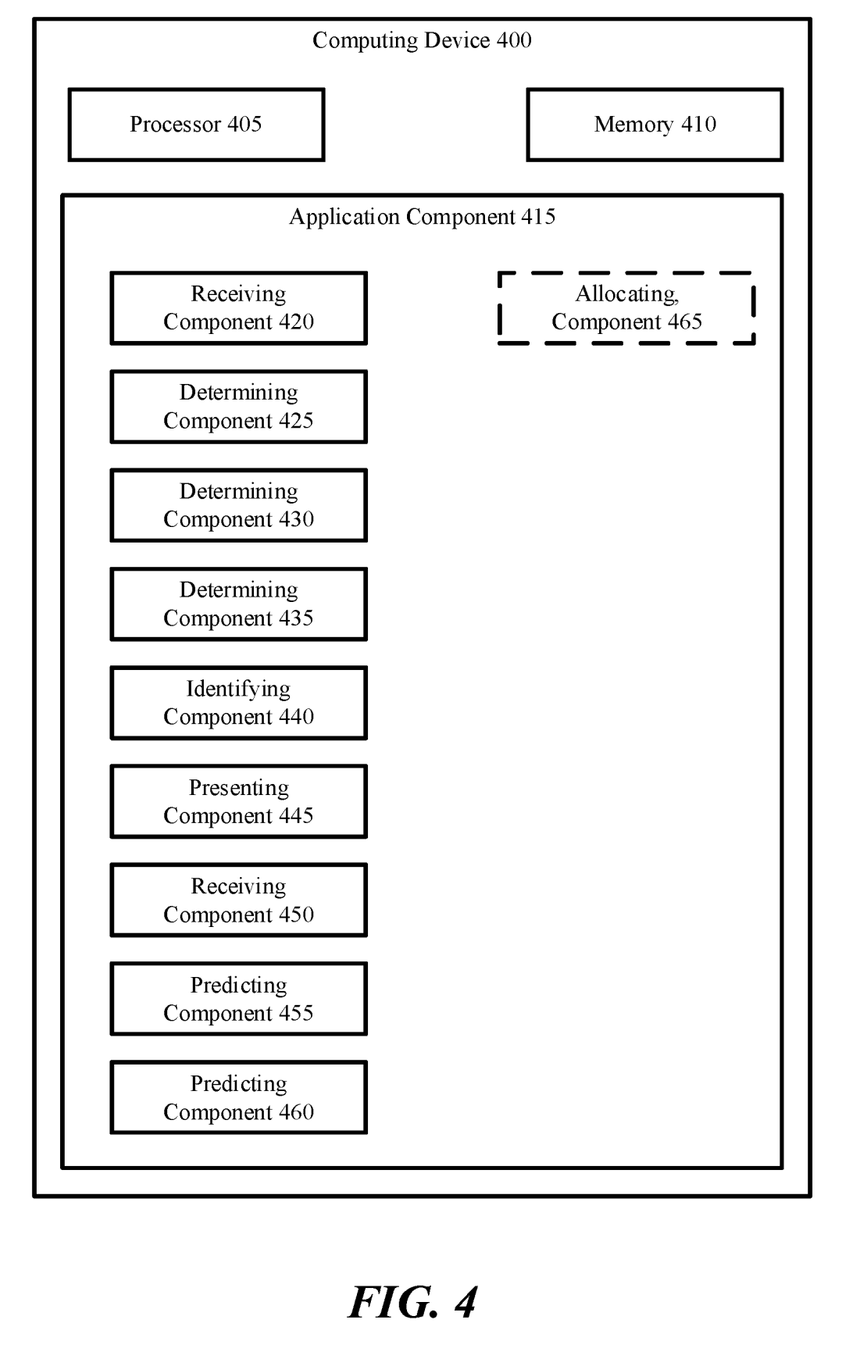
FIG. 4 is a block diagram of an example of a computing device, in accordance with aspects of the present disclosure.

Referring to FIG. 3 and FIG. 4, and continuing to refer to prior figures for context, in operation, computing device 400 may perform a method 300 of wireless communication, by such as via execution of application component 415 by processor 405 and/or processor 410. The description of the methods herein are supplemented by Appendix A and Appendix B submitted herewith and incorporated by reference in their entirety into the body of the present Specification. Appendix A and Appendix B each form part of the disclosure of the present application.

At block 302, the method 300 includes first receiving, by a device location server a first location in a path of a wireless device and a second location in the path, a first odometer value associated with the device corresponding to the first location, and a second odometer value associated with the device corresponding to the second location, wherein the path comprises a set of ordered locations. For example, in an aspect, computing device 400, processor 405, processor 410, application component 415, and/or receiving component 420 may be configured to or may comprise means for first receiving, by a device location server a first location in a path of a wireless device and a second location in the path, a first odometer value associated with the device corresponding to the first location, and a second odometer value associated with the device corresponding to the second location, wherein the path comprises a set of ordered locations. The functions allocated herein to computing device 400 can also be allocated to analysis engine 228 performing as the device location server.

At block 304, the method 300 includes first determining, by the server, a recommended distance between the first location and the second location. For example, in an aspect, computing device 400, processor 405, processor 410, application component 415, and/or determining component 425 may be configured to or may comprise means for first determining, by the server, a recommended distance between the first location and the second location.

At block 306, the method 300 includes second determining, by the server, a magnitude of a difference between the first odometer value and the second odometer value. For example, in an aspect, computing device 400, processor 405, processor 410, application component 415, and/or determining component 430 may be configured to or may comprise means for second determining, by the server, a magnitude of a difference between the first odometer value and the second odometer value.

At block 308, the method 300 includes third determining, by the server, that the magnitude is greater than a threshold. For example, in an aspect, computing device 400, processor 405, processor 410, application component 415, and/or determining component 435 may be configured to or may comprise means for third determining, by the server, that the magnitude is greater than a threshold.

At block 310, the method 300 includes identifying, by server in response to the third determining, at least one candidate missing jurisdiction. For example, in an aspect, computing device 400, processor 405, processor 410, application component 415, and/or identifying component 440 may be configured to or may comprise means for identifying, by server in response to the third determining, at least one candidate missing jurisdiction.

At block 312, the method 300 includes presenting, by the server, each candidate missing jurisdiction. For example, in an aspect, computing device 400, processor 405, processor 410, application component 415, and/or presenting component 345 may be configured to or may comprise means for presenting, by the server, each candidate missing jurisdiction.

At block 314, the method 300 includes second receiving, by the server, a selection of each presented identified candidate missing jurisdiction. For example, in an aspect, computing device 400, processor 405, processor 410, application component 415, and/or receiving component 350 may be configured to or may comprise means for second receiving, by the server, a selection of each presented identified candidate missing jurisdiction.

At block 316, the method 300 includes first predicting, by the server, at least one node in the path in the selected jurisdiction. For example, in an aspect, computing device 400, processor 405, processor 410, application component 415, and/or predicting component 355 may be configured to or may comprise means for first predicting, by the server, at least one node in the path in the selected jurisdiction.

At block 318, the method 300 includes second predicting, by the server, a missing path including the first location, each predicted node, and the second location. For example, in an aspect, computing device 400, processor 405, processor 410, application component 415, and/or predicting component 360 may be configured to or may comprise means for second predicting, by the server, a missing path including the first location, each predicted node, and the second location.

Figure 5:
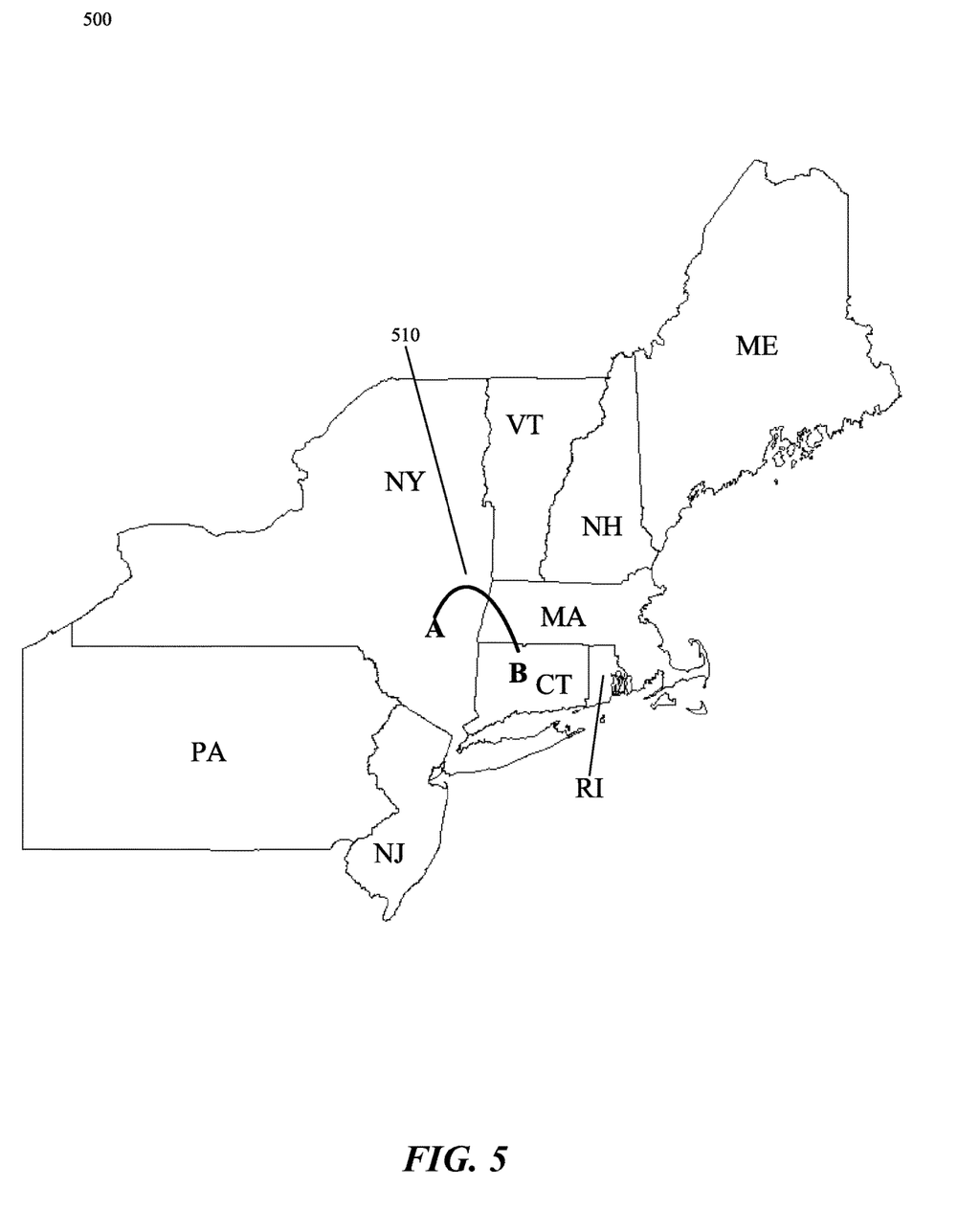
FIG. 5 is an illustration of an example problem domain, in accordance with aspects of the present disclosure.

One example problem that the technology disclosed herein can address is that route information, e.g., latitude and longitude values, may be missing for a considerable period between locations in a vehicle route—possibly for hours, which can lead to missing an entire jurisdiction on a route. A jurisdiction can be a city, county, state, province, territory or an island, e.g., within US & Canada. Referring to FIG. 5, and continuing to refer to prior figures for context, an example problem domain 500 having a first position A in New York (N.Y.) and a second position B in Connecticut (CT). Position/route information between A and B is missing, e.g., due to a defective geolocation device, or due to mountainous terrain. The actual route is shown by route 510. If only the endpoints A and B are considered, one would miss Massachusetts (MA) as a jurisdiction on the route 510. Examples of the technology disclosed herein can predict one or more missing jurisdictions, predict possible positions in the missing jurisdiction, predict possible routes among the positions, and then estimate an average distance traveled in each jurisdiction on the possible routes.

First consider four possible scenarios for missing route data between A and B. In each scenario, A and B are longitude values, while $\delta$ is a threshold error in the distance reported between A and B. In a first scenario, A and B are in the same jurisdiction, and the distance between A and B, $(A-B)_{dist}$, as suggested by a map is approximately equal to the odometer difference, $(O_B-O_A)$; giving $(O_B-O_A)-(A-B)_{dist}<=\delta$. In the first scenario, examples of the present technology can use the suggested map route between A and B or odometer difference, $(O_B-O_A)$.

In a second scenario, A and B are in the same jurisdiction, and the distance between A and B, $(A-B)_{dist}$, as suggested by a map is less than the odometer difference, $(O_B-O_A)$ by more than the threshold; giving $(O_B-O_A)-(A-B)_{dist}>\delta$. In the second scenario, examples of the present technology can suggest, to a user, possible jurisdictions traveled other than the jurisdiction for A and B based on the total distance traveled. If the user picks any of the suggested jurisdictions, such examples can identify a endpoint in the missing jurisdiction, identify possible routes based on the endpoint, and calculate the possible distance in each jurisdiction. If the user does not pick at least one new jurisdiction, such examples can odometer difference, $(O_B-O_A)$ or use the map route between A and B.

In a third scenario, A and B are in different jurisdictions, and the distance between A and B, $(A-B)_{dist}$, as suggested by a map is about equal to the odometer difference, $(O_B-O_A)$; giving $(O_B-O_A)-(A-B)_{dist}<\delta$. In the third scenario, examples of the present technology can use the suggested map distance between A and B, and calculate the possible distance in each jurisdiction.

In a fourth scenario, A and B are in different jurisdictions, and the distance between A and B, $(A-B)_{dist}$, as suggested by a map is less than the odometer difference, $(O_B-O_A)$ by more than the threshold; giving $(O_B-O_A)-(A-B)_{dist}>\delta$. In such scenarios, examples of the present technology can suggest, to a user, possible jurisdictions traveled other than the jurisdiction for A and B based on the total distance traveled. If the user picks any of the suggested jurisdictions, such examples can identify a endpoint in the missing jurisdiction, identify possible routes based on the endpoint, and calculate the possible distance in each jurisdiction. If the user does not pick at least one new jurisdiction, such examples can use the suggested map route between A and B, and calculate the possible distance in each jurisdiction.

Figure 6:
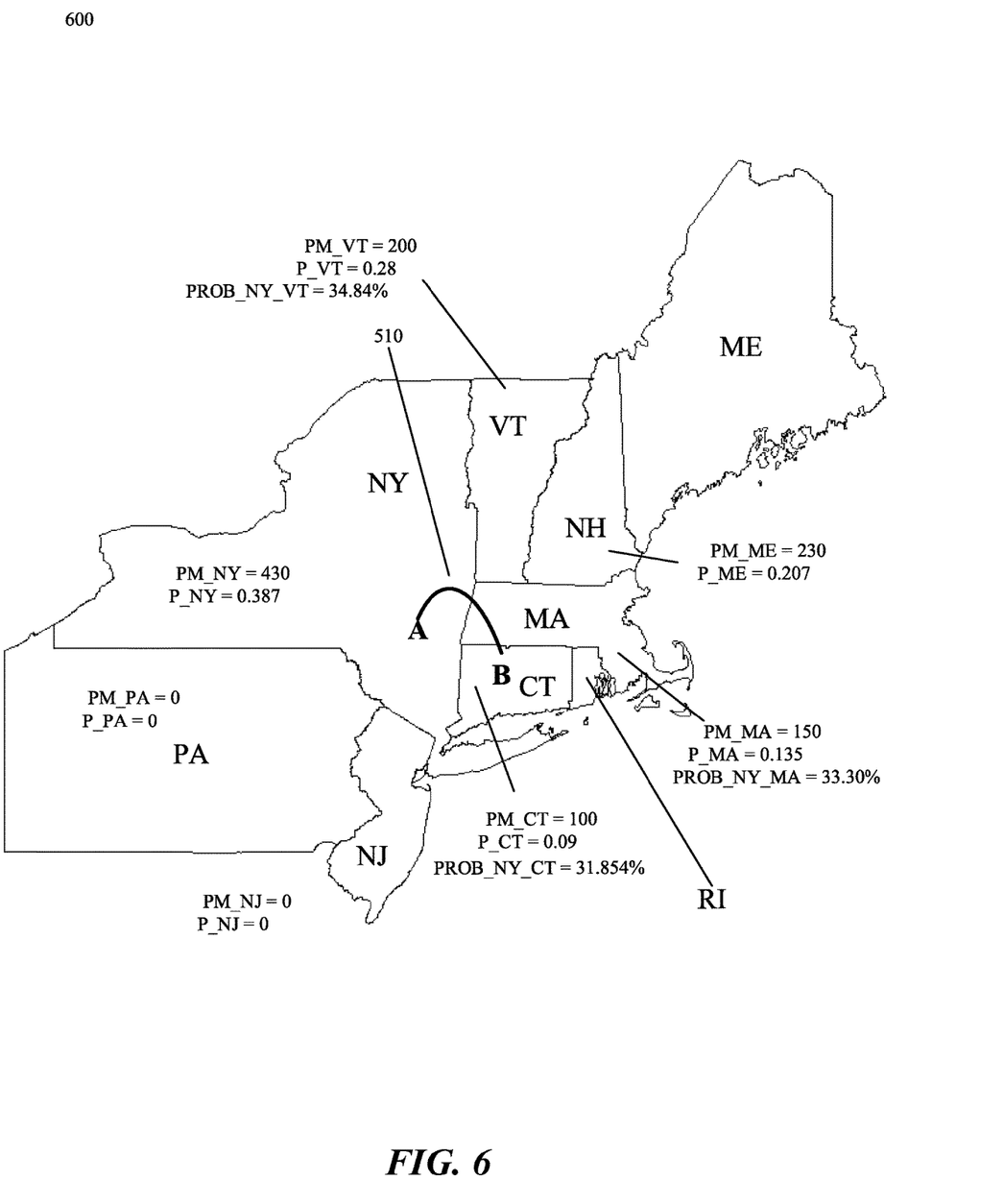
FIG. 6 is an illustration of an example, in accordance with aspects of the present disclosure.

Referring to FIG. 6, and referring to prior figures and the scenarios above for context, examples 600 of the present technology can first create a dictionary for the jurisdiction of the starting position A with surrounding jurisdictions for each jurisdiction. In the example of FIG. 6, the starting position A is within the NY jurisdiction. A dictionary mapping the surrounding jurisdictions is {NY: VT, MA, CT, NJ, PA}. The present technology can then use historical total miles traveled in each jurisdiction for each customer/truck, and build a regression model to predict current miles in all states. The model can be based on any combination of daily aggregates, weekly aggregates or monthly aggregates. Example of the present technology then compute the predicted mileage in each jurisdiction from total miles as PM_i (the predict mileage in state i), as shown in FIG. 6. Each PM_i for jurisdictions surrounding a given jurisdiction is then converted to a proportion P_ij for state i and surrounding jurisdiction j, for example, using P_ij=PM_i/ΣPM_ij. These proportions can be converted to probabilities PROB_i_j using a statistical function. For example, using the softmax function these proportions are converted to probabilities shown in FIG. 6.

Figure 7:
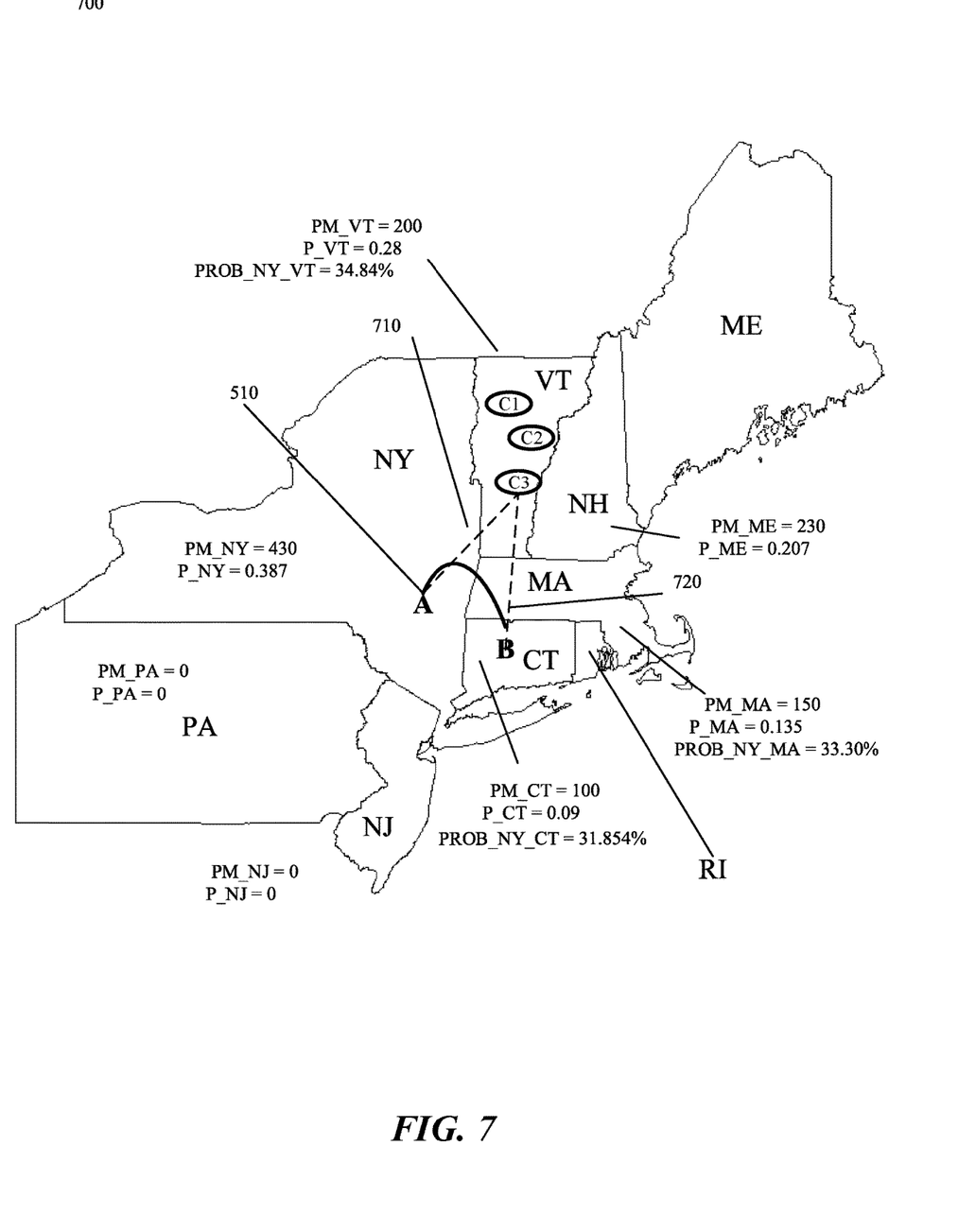
FIG. 7 is an illustration of an example, in accordance with aspects of the present disclosure.

For identifying an endpoint in a chosen missing jurisdiction, the present technology can first identify regions in which customer/truck travels in the missing jurisdiction, for example by using historical raw position pings or aggregated data to cluster regions in each jurisdiction per customer/truck. For example, if the user picked VT as the missing jurisdiction in the example of FIG. 6, then the present technology can use historical position pings or aggregated data for jurisdiction VT to identify regions in which customer frequently travels. Referring to FIG. 7, and continuing to refer to prior figures and scenarios for context, the most frequent travelled spots which are grouped into three clusters C1, C2, and C3. The three jurisdictions in question are NY, VT, and MA. Using the proportion for all the jurisdictions in question, NY—0.387, VT—0.28, and MA—0.135, the technology can convert the proportions to probabilities using a statistical function such as softmax—giving NY—0.3968, VT—0.3084, MA—0.2948. The technology can the use these probabilities as weights $W_i$ where $\Sigma W_i = 1$. Using the total odometer distance from the beginning route in NY to ending route in CT-$O_T$, the technology can calculate the proportion of mileage in the new jurisdiction as $M_{iT}=W_i O_T$, where $M_{iT}$ is total mileage in jurisdiction i. The technology can then remove a proportion of $M_i$ for local deliveries, $rp_i$ to be calculated from historic data, giving $M_i=(1-rp_i)*M_{iT}$. The technology can calculate the distances between each cluster and A and B, for example as shown by dashed lines 710 and 720. For each cluster j, Position A & B, the distances are: Dist(A-$JC_{Aj}$)-1, Dist($JC_{Aj}$-cluster j)-2, Dist(cluster j-$JC_{Bj}$)-3, Dist($JC_{Bj}$-B)-4. Examples of the present technology can pick the cluster with 2+3 closest to $M_i$, where i is the new jurisdiction Min($|M_i-(2+3)_j|$)— minimum of absolute value of $(M_i-(2+3)_j)$ where $M_i$ is the mileage for each of the new jurisdiction and $(2+3)_j$ for each cluster j.

Examples of the present technology can calculate the distance $D_i$ in each jurisdiction, I—where: $D_i=1$ when i is the starting jurisdiction; $D_i=2+3$ when i is the new jurisdiction; and $D_i=4$ when i is the ending jurisdiction; and AD=$(O_B-O_A)-\Sigma D_i$ where AD is the additional distance. In such cases: for new jurisdictions, $TD_i=D_i+W_i*AD$; for known jurisdictions, $TD_i=KD_i+D_i+W_i*AD$. In such cases, TD is the total distance travelled in each jurisdiction, and KD is the known distance.

In a specific example based on the second scenario above, consider that for the beginning and ending points (as latitude and longitude) for a given vehicle on a given day A=[43.162065, −73.52292] and B=[43.364624, −73.602258]. All the position pings between A and B are missing. A and B are in the same jurisdiction NY, but the odometer difference recorded at A and B is about 230 miles, $O_A-O_B=230$ miles. The total distance determined using maps is 19.9 miles, $(A-B)_{dist}=19.9$ miles. Assume a threshold $\delta=10$ miles—then $(O_A-O_B)-(A-B)_{dist}=230-19.9=210.1>\delta=10$.

To identify suggested missing jurisdictions, the technology identifies the surrounding jurisdictions for NY={VT, MA, CT, NJ, PA}. The technology uses a regression model for this customer using historic data, e.g., average miles per month in each jurisdiction for over a year. Using that regression model, the technology predict mileages in all the jurisdictions customer travelled to. Predicted mileage in miles in each jurisdiction=NY—488.69, VT—199.11, MA—343.9, CT— 633.48, NJ—778.26, PA—54.32. Converting these mileages to proportions gives: total miles in all the jurisdiction=488.69+199.11+343.9+633.48+778.26+54.32=2497.76; proportion of miles travelled in NY=488.69/2497.76=0.196; similarly, proportion for VT=0.08, MA=0.138, CT=0.254, NJ=0.312, PA=0.022. The example takes only those proportions for surrounding jurisdictions, VT, MA, CT, NJ, PA and convert them to probabilities using softmax function: VT=0.183, MA=0.194, CT=0.218, NJ=0.2312, PA=0.173.

Using the probabilities, and converting them to chance multiplying by 100 and suggesting to the user their options for missing jurisdiction in decreasing order of probability: "There is a 23.12% chance the vehicle traveled to NJ. There is a 21.8% chance the vehicle traveled to CT. There is a 19.4% chance the vehicle traveled to MA. There is a 18.3% chance the vehicle traveled to VT; There is a 17.3% chance the vehicle traveled to PA." The user picks VT as the missing jurisdiction.

To identify clusters of regions in the selected missing jurisdiction, VT, the technology uses historical time series position ping data or any aggregated data to identify clusters of region where the customer frequently travels.

In this case the technology identified 3 clusters, C1, C2, C3 of FIG. 7 with centers: C1=[44.273563, −72.773396], C2=[43.997595, −72.485005], and C3=[43.602194, −72.464725]. Using the proportion of miles customers travelled in each jurisdiction, the proportions are NY=0.196, VT=0.08—converting to probabilities using softmax function gives, NY=0.52897, VT=0.47103. These values are used as weights, Wi where i=jurisdiction; giving $W_{NY}=0.52897$ and $W_{VT}=0.47103$ where $\Sigma W_i=1$. The total odometer distance, $O_T$ is given by the distance from starting position in NY to A plus $(O_B-O_A)$ plus the distance from B to ending position in NY: $O_T=50+230+37.7=317.7$ miles. The known distance in NY is $KD_{NY}=50+37.7=87.7$. The total miles in VT are given by $M_{T,VT}=W_{VT}*O_T=0.47103*317.7=149.31651$ miles. Removing a proportion of these miles for local deliveries, $rp_i$ using historic data (25% of travel for this customer in VT is local deliveries, $rp_{VT}=0.25$) gives: $M_{VT}=(1-rp_{VT})*M_{T,VT}=0.75*149.32=112.23$ miles. The highway route than doesn't involve local deliveries is 112.23 miles. Referring to TABLE 1, the technology picks the cluster with min($|M_{VT}-(2+3)|$) which is cluster 3.

TABLE 1

|  | Cluster 1 | Cluster 2 | Cluster 3 |
|---|---|---|---|
| 1. Dist(A – $JC_{AJ}$) | 43.06 | 43.06 | 43.06 |
| 2. Dist($JC_{AJ}$ – $C_i$) | 99.36 | 80.61 | 55.35 |
| 3. Dist($C_i$ – $JC_{JB}$) | 99.09 | 80.45 | 55.34 |
| 4. Dist($JC_{JB}$ – B) | 26.56 | 26.56 | 26.56 |
| 2 + 3 | 198.45 | 161.06 | 100.69 |
| $|M_{VT} - (2 + 3)|$ | 86.22 | 48.83 | 11.54 |

From TABLE 1: $D_{NY}$=43.06+26.56=1+4; $D_{VT}$=100.69=2+3; $\Sigma D_i = D_{NY} + D_{VT}$=69.62+100.69=170.31 miles, where is all jurisdictions NY, VT; and AD=$(O_B - O_A) - \Sigma D_i$=230−170.31=59.69 miles. The total distance in VT is: $TD_{VT} = D_{VT} + W_{VT}*AD$=100.69+0.47*59.69=128.74 miles. The total distance in known jurisdiction, NY is: $TD_{NY} = D_{NY} + W_{NY}*AD + KD_{NY}$=69.62+0.53*59.69+87.7=188.96 miles.

In an example based on the fourth scenario from above, consider that for the beginning and ending points (as latitude and longitude) for a given vehicle on a given day A=[42.152152, −74.12769] and B=[41.815421, −73.224537]. All the position pings between A and B are missing. A is in NY, and B is in CT, but the odometer difference recorded at A and B is about 300 miles, $O_A - O_B$=300 miles. The total distance determined using maps is 75.2 miles, $(A-B)_{dist}$=19.9 miles. Assume a threshold $\delta$=10 miles—then $(O_A - O_B) - (A-B)_{dist}$=300−75.2=224.8>$\delta$=10.

To identify suggested missing jurisdictions, the technology identifies the surrounding jurisdictions for NY={VT, MA, CT, NJ, PA}. The technology uses a regression model for this customer using historic data, e.g., average miles per month in each jurisdiction for over a year. Using that regression model, the technology predict mileages in all the jurisdictions customer travelled to. Predicted mileage in miles in each jurisdiction=NY—488.69, VT—199.11, MA—343.9, CT—633.48, NJ—778.26, PA—54.32 (the same as the example based on the second scenario). Converting these mileages to proportions gives: total miles in all the jurisdiction=488.69+199.11+343.9+633.48+778.26+54.32=2497.76; proportion of miles travelled in NY=488.69/2497.76=0.196; similarly, proportion for VT=0.08, MA=0.138, CT=0.254, NJ=0.312, PA=0.022. The example takes only those proportions for surrounding jurisdictions other than the destination jurisdiction, {VT, MA, NJ, PA} and converts them to probabilities using softmax function: VT=0.235, MA=0.249, NJ=0.296, PA=0.221.

Using the probabilities, and converting them to chance multiplying by 100 and suggesting to the user their options for missing jurisdiction in decreasing order of probability: "There is a 29.6% chance the vehicle traveled to NJ. There is a 24.9% chance the vehicle traveled to MA. There is a 23.5% chance the vehicle traveled to VT; There is a 22.1% chance the vehicle traveled to PA." The user picks MA as the missing jurisdiction.

To identify clusters of regions in the selected missing jurisdiction, MA, the technology uses historical time series position ping data or any aggregated data to identify clusters of region where the customer frequently travels.

In this case the technology identified 2 clusters, C1 and C2 with centers: C1=[42.172242, −73.332914], C2=[42.237347, −73.221678]. Using the proportion of miles customers travelled in each jurisdiction, the proportions are NY=0.196, MA=0.138, CT=0.254—converting to probabilities using softmax function gives, NY=0.333, MA=0.314, and CT—0.353. These values are used as weights, Wi where i=jurisdiction; giving $W_{NY}$=0.52897 and $W_{MA}$=0.314, and $W_{CT}$=0.353 where $\Sigma W_i$=1. The total odometer distance, $O_T$ is given by the distance from starting position in NY to A plus $(O_B - O_A)$ plus the distance from B to ending position in CT: $O_T$=98+300+56=454 miles. The known distance in NY is $KD_{NY}$=98. The known distance in CT is $KD_{CT}$=56. The total miles in MA are given by $M_{T,MA} = W_{MA}*O_T$=0.314*454=142.6 miles. Removing a proportion of these miles for local deliveries, $rp_i$ using historic data (50% of travel for this customer in MA is local deliveries, $rp_{VT}$=0.5) gives: $M_{MA} = (1-rp_{MA})*M_{T,MA}$=0.5*142.6=71.3 miles. The highway route than doesn't involve local deliveries is 71.3 miles. Referring to TABLE 2, the technology picks the cluster with min($|M_{MA} - (2+3)|$) which is cluster 2.

TABLE 2

|  | Cluster 1 | Cluster 2 |
|---|---|---|
| 1. Dist(A – $JC_{AJ}$) | 89.55 | 79.04 |
| 2. Dist($JC_{AJ}$ – $C_i$) | 8.55 | 16.68 |
| 3. Dist($C_i$ – $JC_{JB}$) | 10.67 | 22.60 |
| 4. Dist($JC_{JB}$ – B) | 23.8 | 25.57 |
| 2 + 3 | 19.22 | 39.28 |
| $|M_{MA} - (2 + 3)|$ | 52.06 | 31.998 |

From TABLE 2: $D_{NY}$=79.04=1; $D_{MA}$=39.28=2+3; $D_{CT}$=25.57=4; $\Sigma D_i = D_{NY} + D_{MA} + D_{CT}$=79.04+39.28+25.57=143.89 miles, where i is all jurisdictions NY, MA, and CT; and AD=$(O_B - O_A) - \Sigma D_i$=300−143.89=156.11 miles. The total distance in MA is: $TD_{MA} = D_{MA} + W_{MA}*AD$=39.28+0.314*156.11=87.674 miles. The total distance in known jurisdiction, NY is: $TD_{NY} = D_{NY} \pm W_{NY}*AD + KD_{NY}$=79.04+0.333*156.11+98=229.02 miles. The total distance in known jurisdiction, CT is: $TD_{CT} = D_{CT} + W_{CT}*AD + KD_{CT}$=25.57+0.353*156.11+56=136.68 miles.

In some examples, the technology of the present disclosure includes an apparatus to locate wireless devices. The apparatus can include first means for receiving a first location in a path of a wireless device and a second location in the path, a first odometer value associated with the device corresponding to the first location, and a second odometer value associated with the device corresponding to the second location, wherein the path comprises a set of ordered locations. The apparatus can include first means for determining a recommended distance between the first location and the second location. The apparatus can include second means for determining a magnitude of a difference between the first odometer value and the second odometer value. The apparatus can include third means for determining that the magnitude is greater than a threshold. The apparatus can include means for identifying, in response to the third determining, at least one candidate missing jurisdiction. The apparatus can include means for presenting each candidate missing jurisdiction. The apparatus can include second means for receiving a selection of each presented identified candidate missing jurisdiction. The apparatus can include first means for predicting at least one node in the path in the selected jurisdiction. The apparatus can include second means for predicting a missing path including the first location, each predicted node, and the second location.

In some examples, such apparatus can include means for allocating distance from the missing path to each jurisdiction along the missing path. In some examples, the means for first determining comprises means for determining the recommended distance by using a computer-based map service to determine a road distance between the first location and the second location. In some examples, the means for identifying includes means for identifying jurisdictions historically traveled by similar devices having paths including at least one of the first location and the second location. In some examples, means for identifying includes means for identifying the likelihood that the device traveled in each candidate missing jurisdiction based on historical data for similar devices; and the presenting comprises presenting a list of the at least candidate missing jurisdictions in descending order of the likelihood.

As used in this description, the terms "module," "components," "database," "module," "system," and the like are intended to refer to a computer-related entity, either hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device may be a module. One or more modules may reside within a process and/or thread of execution, and a module may be localized on one computer and/or distributed between two or more computers. In addition, these modules may execute from various computer readable media having various data structures stored thereon. The modules may communicate by way of local and/or remote processes such as in accordance with a signal having one or more data packets (e.g., data from one module interacting with another module in a local system, distributed system, and/or across a network such as the Internet with other systems by way of the signal).

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc ("CD"), laser disc, optical disc, digital versatile disc ("DVD"), floppy disk and blue-ray disc where disks usually reproduce data magnetically, while discs reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method to locate wireless devices, comprising:
    first receiving, by a device location server, a first location in a path of a wireless device and a second location in the path, a first odometer value associated with the device corresponding to the first location, and a second odometer value associated with the device corresponding to the second location, wherein the path comprises a set of ordered locations;
    first determining, by the server, a recommended distance between the first location and the second location;
    second determining, by the server, a magnitude of a difference between the first odometer value and the second odometer value;
    third determining, by the server, that the magnitude is greater than a threshold;
    identifying, by the server in response to the third determining, at least one candidate missing jurisdiction;
    presenting, by the server, each candidate missing jurisdiction;
    second receiving, by the server, a selection of each presented identified candidate missing jurisdiction;
    first predicting, by the server, at least one node in the path in the selected jurisdiction; and
    second predicting, by the server, a missing path including the first location, each predicted node, and the second location.

2. The method of claim 1, further comprising allocating, by the server, distance from the missing path to each jurisdiction along the missing path.

3. The method of claim 1, wherein the first determining comprises determining the recommended distance by using a computer-based map service to determine a road distance between the first location and the second location.

4. The method of claim 1, wherein the identifying comprises identifying jurisdictions historically traveled by similar devices having paths including at least one of the first location and the second location.

5. The method of claim 1, wherein the identifying comprises identifying a likelihood that the device traveled in each candidate missing jurisdiction based on historical data for similar devices; and the presenting comprises presenting a list of the at least candidate missing jurisdictions in descending order of the likelihood.

6. An apparatus to locate wireless devices, comprising:
    a memory; and
    a processor in communication with the memory and configured to:
        first receive a first location in a path of a wireless device and a second location in the path, a first odometer value associated with the device corresponding to the first location, and a second odometer value associated with the device corresponding to the second location, wherein the path comprises a set of ordered locations;
        first determine a recommended distance between the first location and the second location;
        second determine a magnitude of a difference between the first odometer value and the second odometer value;
        third determine that the magnitude is greater than a threshold;

identify, in response to the third determining, at least one candidate missing jurisdiction;

present each candidate missing jurisdiction;

second receive a selection of each presented identified candidate missing jurisdiction;

first predict at least one node in the path in the selected jurisdiction; and second predict a missing path including the first location, each predicted node, and the second location.

7. The apparatus of claim 6, wherein the processor is further configured to allocate distance from the missing path to each jurisdiction along the missing path.

8. The apparatus of claim 6, wherein the first determining comprises determining the recommended distance by using a computer-based map service to determine a road distance between the first location and the second location.

9. The apparatus of claim 6, wherein identifying comprises at least one of identifying jurisdictions historically traveled by similar devices having paths including at least one of the first location and the second location.

10. The apparatus of claim 6, wherein identifying comprises identifying a likelihood that the device traveled in each candidate missing jurisdiction based on historical data for similar devices; and to present comprises to present a list of the at least candidate missing jurisdictions in descending order of the likelihood.

11. A non-transitory computer-readable medium comprising stored instructions to locate wireless devices, executable by a processor to:

first receive a first location in a path of a wireless device and a second location in the path, a first odometer value associated with the device corresponding to the first location, and a second odometer value associated with the device corresponding to the second location, wherein the path comprises a set of ordered locations;

first determine a recommended distance between the first location and the second location;

second determine a magnitude of a difference between the first odometer value and the second odometer value;

third determine that the magnitude is greater than a threshold;

identify, in response to the third determining, at least one candidate missing jurisdiction;

present each candidate missing jurisdiction;

second receive a selection of each presented identified candidate missing jurisdiction;

first predict at least one node in the path in the selected jurisdiction; and second predict a missing path including the first location, each predicted node, and the second location.

12. The non-transitory computer-readable medium of claim 11, wherein the processor is further configured to allocate distance from the missing path to each jurisdiction along the missing path.

13. The non-transitory computer-readable medium of claim 11, wherein the first determining comprises determining the recommended distance by using a computer-based map service to determine a road distance between the first location and the second location.

14. The non-transitory computer-readable medium of claim 11, wherein identifying comprises identifying jurisdictions historically traveled by similar devices having paths including at least one of the first location and the second location.

15. The non-transitory computer-readable medium of claim 11, wherein identifying comprises identifying a likelihood that the device traveled in each candidate missing jurisdiction based on historical data for similar devices; and to present comprises to present a list of the at least candidate missing jurisdictions in descending order of the likelihood.

* * * * *